United States Patent [19]

Dombro et al.

[11] Patent Number: 4,590,246

[45] Date of Patent: May 20, 1986

[54] METHOD OF POLYMERIZING OLEFINS

[75] Inventors: Robert A. Dombro; William Kirch, both of Clinton, Iowa

[73] Assignee: Norchem, Inc., Rolling Meadows, Ill.

[21] Appl. No.: 343,201

[22] Filed: Jan. 27, 1982

Related U.S. Application Data

[60] Continuation-in-part of Ser. No. 153,011, May 27, 1980, abandoned, which is a division of Ser. No. 44,004, May 31, 1979, Pat. No. 4,246,137.

[51] Int. Cl.$^4$ .......................... C08F 4/02; C08F 10/00
[52] U.S. Cl. ...................... 526/106; 526/96; 526/130
[58] Field of Search .................. 526/96, 97, 106, 129, 526/130

[56] References Cited

U.S. PATENT DOCUMENTS

| | | | |
|---|---|---|---|
| 2,510,622 | 6/1950 | Archibald et al. | 252/455 |
| 2,825,721 | 3/1958 | Hogan et al. | 526/106 |
| 3,950,316 | 4/1976 | Witt | 526/106 |
| 3,953,413 | 4/1976 | Hwang et al. | 526/96 |
| 4,064,336 | 12/1977 | Hwang | 526/130 |
| 4,146,694 | 3/1979 | Hwang et al. | 526/130 |
| 4,246,137 | 1/1981 | Dombro et al. | 252/436 |

*Primary Examiner*—Edward J. Smith
*Attorney, Agent, or Firm*—Wood, Dalton, Phillips, Mason & Rowe

[57] ABSTRACT

A method of polymerizing olefins comprising contacting an olefin or mixture of olefins with a catalyst prepared with large pore volume zirconia-silica catalyst supports. The supports are prepared by reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH equal to at least 11, then adding an acidic solution to a pH of about 5–9 to produce a hydrocogel. The hydrocogel is then aged and washed free of soluble by-products with an aqueous washing agent. Water is removed from the washed hydrocogel by azeotropic distillation or by washing with a water miscible solvent and then calcining the resulting xerocogel.

6 Claims, 1 Drawing Figure

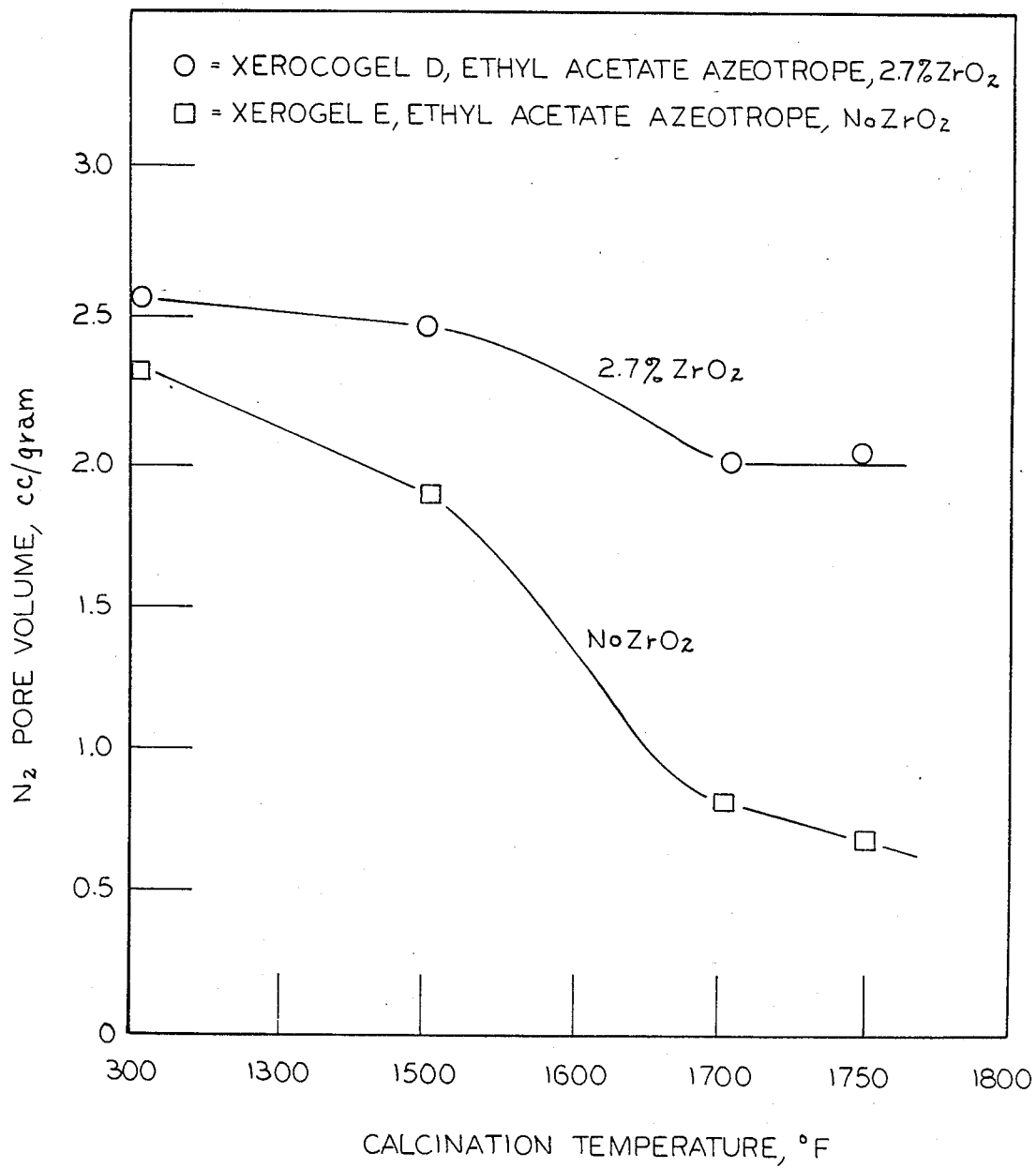

METHOD OF POLYMERIZING OLEFINS

CROSS-REFERENCE TO RELATED APPLICATIONS

This application is a continuation-in-part of copending application Ser. No. 153,011, filed May 27, 1980, now abandoned which is a division of application Ser. No. 44,004, filed May 31, 1979, now U.S. Pat. No. 4,246,137.

BACKGROUND OF THE INVENTION

According to this invention, an improved large pore volume zirconia-silica catalyst support useful in olefin polymerization catalysts is prepared by reacting a particular zirconium compound with an alkali metal silicate to produce a hydrocogel, aging the hydrocogel, washing the hydrocogel with an aqueous washing agent, removing water from the resulting washed hydrocogel to produce a xerocogel either by azeotropic distillation or by leaching with a water miscible solvent, and calcining the resulting xerocogel.

A further feature of the invention is a method of polymerizing olefins comprising contacting the olefins with a catalyst comprising the above support and a chromium compound associated with it under polymerizing conditions.

The most pertinent prior art of which we are aware are the following:

U.S. Pat. No. 2,289,919 discloses purified silica hydrogel (free of sodium ion) suspended in a zirconium salt solution (aqueous zirconyl chloride). Aqueous ammonium hydroxide is then added in order to precipitate zirconia onto the hydrogel (not coprecipitated). The zirconia-silica mixture is washed, dried at 300° F., and calcined.

U.S. Pat. No. 2,444,913 discloses a method of preparing plural oxide catalysts containing zirconia and silica which comprises preparing a solution containing silica and zirconia by mixing an alkali metal silicate solution with an alkali metal zirconium carbonate solution and coprecipitating the silica and zirconia in said solution by the addition of an acid to a pH of about 6.5. The hydrogel is dried at 200°–210° F. and calcined at 1400° F. in an air-stream.

U.S. Pat. No. 3,950,316 discloses a method of preparing a silica-titania catalyst support comprising mixing a water soluble titanium compound (potassium titanium oxalate, $K_2TiO(C_2O_4)_2.2H_2O$ or ammonium titanium oxalate, $(NH_4)_2TiO(C_2O_4)_2.H_2O$ with an alkali metal silicate solution, said titanium compound being nonreactive with the silicate, adding an acidic material to the silicate containing the titanium compound to form a hydrogel, aging the hydrogel for more than one hour, washing the aged hydrogel with either an ammonium salt solution or a dilute acid to produce an alkali-free hydrogel, forming a mixture comprising said washed hydrogel and a normally liquid oxygen-containing water soluble organic azeotrope-forming compound, separating the organic compound with water to form a xerogel. In the present invention, in contrast, the zirconium oxalate is reactive with the alkali metal silicate. For example, ammonia gas is liberated when ammonium zirconium oxalate is mixed with sodium silicate solution.

U.S. Pat. No. 3,862,104 is similar to the above U.S. Pat. No. 3,950,316 except potassium titanate oxalate in aqueous solution with sodium silicate is added to an ammonium sulfate solution.

U.S. Pat. No. 3,801,705 discloses a method for providing a silica xerogel having a narrow pore diameter distribution within the range 300–600Å, surface area within the range 200–500 m$^2$/g, and a large pore volume between 2–3.5 cc/g.

None of the above discloses the claimed invention.

BRIEF DESCRIPTION OF THE DRAWINGS

FIG. 1 is a plot of nitrogen pore volume versus the calcination temperature for the xerogels of Examples D and E.

DESCRIPTION OF THE PREFERRED EMBODIMENTS

In this invention, an alkali metal or ammonium zirconium oxalate compound is used as the zirconia source during coprecipitation with silica from an alkali metal silicate in the presence of an acidic compound. These new catalyst supports have increased thermal stability towards high catalyst activation temperatures and produce resins with increased melt index when used as a polymerization catalyst support, especially with catalysts based on chromium(III)acetylacetonate particularly with this type of catalyst disclosed in prior U.S. Pat. No. 3,953,413 assigned to the assignee hereof and incorporated herein by reference.

The preparation of large pore volume zirconia-silica is by coprecipitating or copolymerizing hydrous zirconia and hydrous silica by dissolving or reacting a zirconium compound of the type $M_4Zr(C_2O_4)_4.nH_2O$, where M is an alkali metal or ammonium ion and n equals 0 to 10, with a silicon compound of the type $A_2SiO_3$, where A is an alkali metal, in aqueous solution at a pH of at least 11.0 followed by the addition of an acidic compound such as sulfuric acid, hydrochloric acid, or ammonium sulfate to a pH of about 5–9. The resulting hydrocogel is then aged at ambient temperature to 90° C. for at least one hour followed by washing with an aqueous washing agent. The washing agent may be water alone, but preferably comprises an aqueous solution of one or more thermally decomposible salts, which leave no residue in the calcined xerocogel.

Water removal from the washed hydrocogel to produce the xerocogel is accomplished by azeotropic distillation with compounds capable of forming an azeotrope with water, for example, ethyl acetate or benzene, or by washing the hydrocogel with a water miscible solvent such as acetone. The final xerocogel is calcined at a temperature in the range of about 1000°–1800° F. prior to use as an olefin polymerization catalyst support.

A xerocogel having a nitrogen pore volume in the range of about 1.5 to 3.5 cc/g, a surface area in the range of about 200–600 m$^2$/g and a pore diameter in the range of about 200Å to 600Å is obtained. The concentration of zirconia ($ZrO_2$) in the xerocogel is in the range of about 0.1 to 67.5 wt. %, preferably about 1 to 5 wt. %.

It is desirable that both the zirconium compound and the alkali metal silicate be together in solution prior to cogel precipitation by strong acid. The pH of this solution determines whether premature precipitation of zirconia takes place completely or in part. If premature precipitation of zirconia takes place, it will obviously not be coprecipitated with silica and will therefore be lost by a necessary filtration step prior to coprecipitation by strong acid. Therefore, the pH of a solution of the zirconium compound and the alkali metal silicate should not drop below about 11.0 prior to the coprecipitation of zirconia and silica by strong acid.

The presence of oxalate anions insures or increases the solubility of the zirconium compound at a particular pH. For example, when a solution of zirconium sulfate (pH=2.0) was used in place of ammonium tetraoxalatozirconate and was added to a solution of sodium silicate (pH=11.6), substantial premature precipitation of hydrous zirconia took place even at a pH as high as 11.4. This necessitated removal by filtration, and therefore loss of zirconia, prior to strong acid promoted coprecipitation of what zirconium was left in solution. Thus, the targeted 2 wt. % zirconium in the final xerocogel was only 1.6 wt. %.

The washing step effects reduction in the content of alkali metal acid-base salt by-products (typically sodium sulfate) formed during coprecipitation in the hydrocogel to negligible levels. Should excessive amounts of the alkali metal salt remain in the hydrocogel pores, collapse of the pores during calcination or catalyst activation might result. Removal of by-product alkali metal salts is preferably accomplished by washing the hydrocogel with water and an aqueous solution of at least one thermally decomposable salt which displaces the alkali metal salt and which leaves no residue in the calcined xerocogel.

Selection of the thermally decomposible salt used in the washing step is not critical as long as the content of alkali metal by-product left in the hydrocogel pores is reduced to negligible levels. Suitable thermally decomposible salts include ammonium nitrate, ethylenediamine diacetate and ammonium carbonate. Further, it has been found that washing with water alone provides acceptable results if sufficient water is used.

The preparation of the coprecipitated zirconia-silica and silica catalyst supports of this invention is illustrated by the following Examples A–F.

Example A—Lithium tetraoxalatozirconate (IV) Hydrate as the Zirconia Source

A solution of 15 grams of lithium tetraoxalatozirconate (IV) hydrate in 400 cc deionized water (pH=3.4) was added to a stirred solution of 400 grams of sodium silicate (% $Na_2O$), 6.75; % $Si_2$, 25.3; wt. ratio $SiO_2$/$Na_2O$, 3.75) in 800 cc deionized water. The cloudy solution was then filtered. To the filtered solution, 12.75% sulfuric acid was added dropwise with stirring to a pH of 6. The coprecipitated hydrocogel was aged at about 90° C. for at least one hour during which time the pH was controlled at 6. The aged coprecipitated hydrocogel was then suction filtered and washed first with deionized water, a solution of 1% aqueous ammonium nitrate, and finally deionized water until sodium, lithium and sulfate ions were as completely removed as possible. Water was removed azeotropically with ethyl acetate. The recovered xerocogel was calcined at 1500° F. in air prior to use as a catalyst support (see Example 5 of Table 2). Weight percent zirconium was 1.87, as zirconia 2.6 and nitrogen pore volume was 2.29 cc/g.

Example B—Sodium Tetraoxalatozirconate (IV) Hydrate as the Zirconia Source

A solution of 66 grams of sodium tetraoxalatozirconate (IV) hydrate in 2400 cc deionized water (pH=4.5) was added to a stirred solution of 2400 grams sodium silicate (% $Na_2O$, 6.75; % $SiO_2$, 25.3; wt. ratio $SiO_2$/$Na_2O$, 3.75) in 4800 cc deionized water. Since an essentially clear solution was obtained, no filtration step was required. To the solution, initially at a pH of 11, was added 1800 cc of a 12.75% aqueous sulfuric acid solution dropwise with stirring. A pH of 6 was reached. The precipitated hydrocogel was then aged at about 90° C. for at least one hour, for example 10 hours. An additional 25 cc of 12.75% sulfuric acid was required to maintain the pH at 6. Following aging the hydrocogel was suction filtered and washed first with deionized water, a solution of 1% aqueous ammonium nitrate, and finally deionized water until sodium and sulfate ions were recovered. The bulk of the water was removed from the hydrocogel by acetone; the remaining water was removed azeotropically with a mixture of n-heptane and n-hexane. The recovered xerocogel was calcined at 1500° F. in air prior to use as a catalyst support (see Example 6 of Table 2). Weight percent zirconium was 1.3, as zirconia 1.8 and nitrogen pore volume was 1.35 cc/g.

Example C—Potassium Tetraoxalatozirconate (IV) Hydrate as the Zirconia Source A solution of 111 grams potassium tetraoxalatozirconate (IV) hydrate in 2400 cc deionized water (pH=6.7) was added to a stirred solution of 2400 grams sodium silicate (% $Na_2O$, 6.75; % $SiO_2$, 25.3; wt. ratio $SiO_2$/$Na_2O$, 3.75) in 4800 cc deionized water. The resulting cloudy solution was filtered to remove small amounts of suspended solid. To the filtered solution, initially at a pH of 10.7 was added a total of 1680 cc of 12.75% sulfuric acid dropwise with stirring. Aging at a pH of about 6.0 was for at least one hour at 90° C., for example, 10 hours. The final pH was 6.3. Following aging the hydrocogel was suction filtered, washed with deionized water, 1% ammonium nitrate, and again deionized water. Water was removed from the hydrocogel azeotropically with ethyl acetate. The recovered xerocogel was calcined at 1500° F. in air prior to being used as a catalyst support (see Example 7 of Table 2). Weight percent zirconium was 2.1 and as percent zirconia 2.8.

Example D—Ammonium Tetraoxalatozirconate (IV) Pentahydrate as the Zirconia Source A solution of 13 grams ammonium tetraoxalatozirconate (IV) pentahydrate in 400 cc deionized water (pH=3.5) was added at about 20° C. to a stirred solution of 400 grams sodium silicate (% $Na_2O$, 6.75; % $SiO_2$, 25.3; wt. ratio $SiO_2$/$Na_2O$, 3.75) in 800 cc deionized water. A slightly cloudy solution with a pH of 11.3 was obtained. Dilute sulfuric acid (12.75%) was then added until a pH of about 6 was reached. The resulting coprecipitate was then aged for at least one hour, for example 4 hours, at about 90° C. while maintaining the pH at 6.0 with additional dilute sulfuric acid. Following aging, the hydrocogel was collected by filtration and washed first with deionized water, a solution of 1% ammonium nitrate, and finally with deionized water. Water was removed azeotropically with ethyl acetate. The recovered xerocogel was air dried up to 80° C. to remove absorbed ethyl acetate. The xerocogel was separated into four 1 to 2 gram portions which were calcined for one hour at 300° F., 1500° F., 1700° F. and 1750° F., respectively. Each sample was then analyzed for nitrogen pore volume. Results are shown in FIG. 1. Comparison of pore volume data with that of the xerogel of Example E clearly shows that the tendency for pores to collapse with heating is reduced by the presence of zirconia with silica as a coprecipitate.

A larger portion of the recovered xerogel was calcined at 1500° F. in air prior to use as a catalyst support (see Example 8 of Table 2). The nitrogen pore volume was 2.45 cc/gram.

Example E—No Zirconia

Dilute aqueous sulfuric acid (12.6%) was added to a stirred solution of 200 grams sodium silicate (% Na$_2$O, 6.75; % SiO$_2$, 25.3; wt. ratio SiO$_2$/Na$_2$O, 3.75) in 500 cc deionized water (pH=11.6). When a pH of 6 was reached, the slurry was aged by heating at least one hour, for example, 2 hours, with stirring at about 90° C. while maintaining the pH at 6 by adding dilute sulfuric acid. After aging, the hydrogel was recovered by filtration and washed first with deionized water, a solution of 1% ammonium nitrate, and finally with deionized water in order to remove all soluble by-products. Water was removed azeotropically with ethyl acetate. The recovered xerogel was then air dried to remove absorbed ethyl acetate.

One to two gram samples of the xerogel were calcined for one hour at 300° F., 1500° F., 1700° F. and 1750° F. respectively. Each sample was then subjected to a nitrogen pore volume determination. Results are presented in FIG. 1. One can easily see the fall-off in pore volume with increased calcination temperature.

A larger portion of the recovered xerogel was calcined at 1500° F. in air prior to use as a catalyst support (see Example 4 of Table 2). The nitrogen pore volume was 1.84 cc/gram.

Example F—Washing Step Can Be Carried Out with Various Aqueous Washing Agents

A hydrocogel containing 2 wt. % zirconium (nominal) was prepared according to Example A, except for the washing step. A single batch of the hydrocogel was washed five times with water and divided into five fractions. The fractions were slurried with a washing agent comprising water, a 1% aqueous solution of ethylenediamine diacetate, a 1% aqueous solution of ammonium carbonate, and a 1% aqueous solution of ammonium nitrate, respectively. Each slurry was then filtered to recover the hydrocogel which was then washed five times more with aliquots of the washing agents.

Final washing of each fraction with water revealed that essentially undetectable amounts of sodium sulfate were present in each case. The five washed hydrocogel fractions were then dried by azeotropic distillation with ethyl acetate, as in Example A.

Surface area and pore volume data for each fraction (see Table 1, below) showed good agreement within experimental error, that the agent used in the washing step is not critical as long as the alkali metal salt is removed.

TABLE 1

| Hydrocogel Washing | ←ZrO$_2$.SiO$_2$, 2 wt. % Zr→ | | | |
|---|---|---|---|---|
| | H$_2$O | H$_2$O 1% (H$_2$NCH$_2$)$_2$ H$_2$O | H$_2$O 1% (NH$_4$)$_2$CO$_3$ H$_2$O | H$_2$O 1% NH$_4$NO$_3$ H$_2$O |
| Water Removal | ←azeotropically with ethylacetate→ | | | |
| Conditioning | ←300° F., vacuum→ | | | |
| Surface Area - m$^2$/g (B.E.T.) | 363 | 360 | 355 | 387 |
| N$_2$ Pore Volume, | 2.35 | 2.73 | 2.44 | 2.30 |

TABLE 1-continued cc/g

Catalyst Preparation

The preparation of olefin polymerization catalysts having as a support the coprecipitated zirconia-silica is illustrated as follows:

Chromium (III) acetylacetonate type catalysts were prepared by dry mixing the chromium chelate with the calcined xerocogel (Examples 5, 6, 7 and 8 of Table 2). Heat activations were in a non-oxidizing atmosphere at 800°–2000° F.,such as at 1700° F. in nitrogen, followed by a 30 minute dry air treatment at 1300° F. in a fluid bed. Chromium chelate catalysts based on a moderate pore volume silica (Example 2), on a moderate pore volume silica containing surface absorbed zirconia (Example 3) or on an initially high pore volume silica (Example 4) were prepared and activated in a similar fashion.

All catalysts contained 1 wt. % chromium.

The polymerization of olefins using the catalyst of this invention is illustrated by the polymerization of ethylene. A specific example of this is as follows:

Resin synthesis was in a one gallon autoclave with isobutane as diluent and under 550 psi pressure. Ethylene was fed on demand. Synthesis conditions were at 225° F. (see Table 2, below).

The preparation of the catalysts using these supports and polymerization of ethylene to polyethylene are illustrated by the accompanying Table and can be summarized as follows:

EXAMPLE 1

A commercial Phillips type chromium (VI) oxide catalyst based on a moderate pore volume (1.65 cc/gram), zirconia-free silica and activated in air at 1700° F. produced a polyethylene resin at 225° F. with a low milled melt index of 0.1.

EXAMPLE 2

A chromium(III) acetylacetonate type catalyst based on the same moderate pore volume, zirconia-free support as described in Example 1, activated at 1700° F. in nitrogen followed by air treatment at 1300° F. produced a polyethylene resin at 225° F. with an improved milled melt index of 0.4, still a relatively low value.

EXAMPLE 3

This example shows that a chromium(III) acetylacetonate catalyst based on the same moderate pore volume support as in Examples 1 and 2, but containing surface zirconia, showed no improvement in resin melt index.

EXAMPLE 4

The chromium (III) acetylacetonate type catalyst of this example was based on a high pore volume zirconia free silica and demonstrates that although the pore volume was initially high, 2.30 cc/gram, the resin melt index was only 2.3 due to the collapse of unstabilized pores. Under the 1700° F. activation conditions of the catalyst, the pore volume was reduced to 1.64 cc/gram.

EXAMPLE 5

A chromium(III) acetylacetonate catalyst based on a high pore volume silica containing coprecipitated zirconia from lithium tetraoxalatozirconate(IV) hydrate, activated at 1700° F. followed by air treatment at 1300° F., produced a resin at 225° F. with a melt index almost double, 4.1, that from a resin derived from a zirconia-free catalyst Example 4).

EXAMPLE 6

This chromium(III) acetylacetonate type catalyst was based on a moderately high pore volume silica containing coprecipitated zirconia from sodium tetraoxalatozirconate(IV) hydrate. This catalyst may be compared to that of Example 2, also a moderate pore volume catalyst. The resin melt index was 0.9, again higher than the melt index of a resin produced by a nearly equivalent catalyst without zirconia.

EXAMPLE 7

This chromium(III) acetylacetonate type catalyst was based on a moderate high pore volume silica containing coprecipitated zirconia from potassium tetraoxalatozironate(IV) hydrate. A review of the data again shows improved resin melt index.

EXAMPLE 8

A chromium(III) acetylacetonate type, catalyst was based on a high core volume silica containing coprecipitated zirconia from ammonium tetraoxalatozirconate(IV) hydrate. The resin melt index of 3.4 was in close agreement with the melt index of a resin produced from a similar catalyst based on silica containing coprecipitated zirconia from lithium tetraoxalatozirconate(IV) hydrate (Example 5).

The melt index of the polyethylene prepared with the catalysts of this invention is dependent upon the source of zirconia. This is a surprising result. For example, the melt indices increase in the following order where the zirconia source is as indicated:

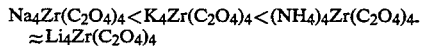

$Na_4Zr(C_2O_4)_4 < K_4Zr(C_2O_4)_4 < (NH_4)_4Zr(C_2O_4)_4 \approx Li_4Zr(C_2O_4)_4$

EXAMPLE 9

Vinyl Unsaturation of Polyethylene Resin Made from the Catalyst of Example 5

The vinyl unsaturation per 2000 carbon atoms ($V_g/2000$ c) of the resin of Example 5 was compared with that of a resin made with a chromium catalyst supported on zirconia-free $TiO_2.SiO_2$, made according to the method of Witt U.S. Pat. No. 3,950,316.

The $V_g/2000$ c of the resin of Example 5 was 2.3, while that of the resin made with the Witt catalyst was 3.1, which is significantly higher. ($V_g/2000$ c values were determined by infrared spectrophotometry at 909 $cm^{-1}$.)

The relatively low level of vinyl unsaturation of the resin of Example 5 indicates a relatively great resistance to thermal or oxidative degradation, which results in a relatively high level of resistance to stress cracking and improved processing stability.

EXAMPLE 10

Molecular Weight and Molecular Weight Distribution of Resins Made with Catalysts of the Invention The supports of the catalysts in the invention method of polymerizing are made by coprecipitation of silica with zirconia, followed by a special water removal procedure. The resultant support used in the inventive method of the application is a high pore volume support that is also stable. When such a support is used with chromium-containing polymerization catalysts in the method of the application, the resulting resins have unexpectedly narrow molecular weight distribution (low $R_d$) and low molecular weight (high MI), as demonstrated below.

The $R_d$ and MI of the resins of Examples 5 and 8 are compared with the $R_d$ and MI of resins made with catalysts described in Hogan et al. U.S. Pat. No. 2,825,721 at Table VIII, line 12. The catalysts were prepared as follows:

Coprecipitation Method I

A silica-zirconia-alumina cracking catalyst was prepared as follows: 346 g of sodium silicate solution (25% as $SiO_2$) was dissolved in 800 cc water. A solution of 14.7 g aluminum nitrate nanohydrate and 22 g zirconyl nitrate dihydrate in 400 cc water was then added dropwise with stirring at 25° C. to the sodium silicate solution. Coprecipitation readily occurred and a final pH of about 10 was reached. The slurry was heated at 70° C. for one hour and then cooled. The product was then collected, washed with water, an aqueous ammonium chloride solution, washed with water again and finally dried at 110° C. Grinding of the granular dry product gave a powder which was then calcined at 500° C. for two hours. This material contained 82° $SiO_2$, 10%

TABLE 2

| Example No. | $ZrO_2$ Source[a] | Wt. % $ZrO_2$ | $N_2$[b] P.V., cc/g | Chromium Source | Activation, °F. $N_2$ | Activation, °F. Air | Resin[f] Synthesis Temp., °F. | Milled MI[c] |
|---|---|---|---|---|---|---|---|---|
| 1 | none | none | 1.65 | $CrO_3$ | — | 1700 | 225 | 0.1 |
| 2 | none | none | 1.65 | $Cr(AcAc)_3$[e] | 1700 | 1300 | 225 | 0.4 |
| 3 | $ZrO(NO_3)_2$[d] | 1.3 | 1.65 | $Cr(AcAc)_3$ | 1700 | 1300 | 225 | 0.4 |
| 4 | none | none | 1.84 | $Cr(AcAc)_3$ | 1700 | 1300 | 225 | 2.3 |
| 5 | LiZrOx | 2.6 | 2.29 | $Cr(AcAc)_3$ | 1700 | 1300 | 225 | 4.1 |
| 6 | NaZrOx | 1.8 | 1.35 | $Cr(AcAc)_3$ | 1700 | 1300 | 225 | 0.9 |
| 7 | KZrOx | 2.8 | — | $Cr(AcAc)_3$ | 1700 | 1300 | 225 | 1.3 |
| 8 | $NH_4ZrOx$ | 2.7 | 2.45 | $Cr(AcAc)_3$ | 1700 | 1300 | 225 | 3.4 |

Footnotes:
[a] Alkali metal ammonium tetraoxalatozirconate(IV) hydrates, or zirconyl nitrate as indicated.
[b] Pore volume of xerocogel after calcination at 1500° F. Catalysis, Vol. II, pp. 111–116, P. H. Rheinhold Publishing Corp., New York, N.Y., 1955.
[c] Milled resin melt index, grams per 10 minutes: ASTM D-1238-62T.
[d] Not coprecipitated but impregnated onto an existing silica xerogel followed by calcination to provide zirconia on silica.
[e] Chromium(III) acetylacetonate.
[f] Resin synthesis conditions were at the temperature indicated, in isobutane and under 550 psig total pressure.

$ZrO_2$ and 5% $Al_2O_3$ by actual analysis which is substantially identical to the $SiO_2$-$ZrO_2$-$Al_2O_3$ support described in Table VIII, line 12 of Hogan et al U.S. Pat. No. 2,835,721, which is the only support in Table VIII containing a combination zirconium and silicon compound.

Impregnation/Calcination Method II

Ninety-one grams of the identical silica used in Examples 1 and 2, above, was impregnated with a solution of 21.5 g zirconyl nitrate dihydrate and 1.47 g aluminum nanohydrate in 100 cc water. The mixture was then dried at 200° C. for two hours followed by calcination for a period of four hours at 500° C. The product contained 88% $SiO_2$, 8.8% $ZrO_2$ and 9.6% $Al_2O_3$ by actual analysis which is also practically identical to the $SiO_2$-$ZrO_2$-$Al_2O_3$ support mentioned in Table VIII of Hogan et al. U.S. Pat. No. 2,825,721.

Each of the silica-zirconia-alumina supports was converted into a chromium containing polymerization catalyst and tested for the polymerization of ethylene by the method described above. Test results are as follows:

| Chromium Catalyst from | Characteristics of Polyethylene Produced with the Catalyst | | |
|---|---|---|---|
| | $R_d$ | Sw | MI |
| Example 5 | 5.4 | 4.5 | 4.1 |
| Example 8 | 4.0 | 4.9 | 3.4 |
| Chromium oxide catalyst with Coprecipitated $SiO_2$—$ZrO_2$—$Al_2O_3$ of Method I | Catalyst not sufficiently active to polymerize ethylene | | |
| Chromium oxide catalyst with Impregnated $SiO_2$—$ZrO_2$—$Al_2O_3$ of Method II | 7.1 | 4.9 | 1.1 |

$R_d$ is a measure of molecular weight distribution and is explained in the article by Shida and Cancio, *Polymer Engineering and Science*, Vol. II, No. 2 at 124 (March 1971). Sw is a measure of weight swell value as defined in an article by Cancio, L. V. and Joyner, R. S., *Modern Plastics* (January 1977). MI is melt index.

All catalysts were prepared by dry blending the support with sufficient chromium (III) acetylacetonate to give 1 wt. % chromium. Activation took place in $N_2$ at 1700° F. followed by a dry air treatment at 1300° F. The activated catalysts were tested at 225° F., in 2900 cc isobutane and 550 psig ethylene.

The foregoing results clearly distinguish the inventive methods of polymerizing using catalysts having the novel zirconia-silica cogel support, from the zirconia-silica-alumina cracking catalyst of Hogan et al. U.S. Pat. No. 2,825,721, Table VIII in that the Hogan type coprecipitated variation resulted in a nearly inactive catalyst while the impregnated type gave a moderately active catalyst which produced a resin with broad molecular active distribution (high $R_d$) and high molecular weight (low MI), making it unsuitable for injection molding applications. These characteristics are in contrast to the polymers produced by the method of this invention. Resins with low $R_d$ values show less warpage and greater strength and hence are best suited for injection molding and other applications.

All parts and percentages herein are by weight.

Having described our invention as related to the embodiments set out herein, it is our intention that the invention be not limited by any of the details of description, unless otherwise specified, but rather be construed broadly within its spirit and scope as set out in the appended claims.

We claim:

1. The method of polymerizing olefins comprising contacting said olefins under polymerizing conditions with a catalyst prepared by:
    (a) reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH of at least 11 and then adding an acidic material to a pH of about 5–9, to produce a hydrocogel;
    (b) aging said hydrocogel at a temperature between about ambient to 90° C. for at least one hour;
    (c) washing said hydrocogel of (b) first with water, then with aqueous ammonium nitrate and again with water to remove acid-base salts;
    (d) removing water from the resulting washed hydrocogel of (c) to produce a xerocogel by azeotropic distillation by mixing with compounds capable of forming an azeotrope with water or by washing the hydrocogel with a water miscible solvent to produce a substantially water-free, large pore volume zirconia-silica catalyst support;
    (e) calcining the resulting xerocogel at a temperature of about 1000°–1800° F. preparatory to its use as an olefin polymerization catalyst support;
    (f) introducing a chromium compound onto said calcined support of (e); and
    (g) activating to produce an active polymerization catalyst.

2. The method of claim 1 wherein M is an alkali metal.

3. The method of claim 1 wherein M is an ammonium ion.

4. The method of claim 1 wherein said acidic compound in said aqueous solution is sulfuric acid, hydrochloric acid or ammonium sulfate.

5. The method of claim 1 wherein water is removed from the washed hydrocogel by azeotropic distillation with a compound capable of forming an azeotrope with water.

6. The method of claim 1 wherein water is removed by washing the hydrocogel with a water miscible solvent.

* * * * *